Patented Sept. 15, 1953

2,652,402

UNITED STATES PATENT OFFICE 2,652,402

SERIES OF NEW 3-AMINO-2-OXAZOLIDONES AND THE PREPARATION THEREOF

Gabriel Gever, Oxford, N. Y., assignor to Eaton Laboratories, Inc., Norwich, N. Y., a corporation of New York No Drawing. Application February 28, 1952, Serial No. 274,067

7 Claims. (Cl. 260—307)

This invention relates to a new series of chemical compounds and the preparation thereof. The series consists of a number of closely related 3-amino-2-oxazolidones. They are described by the general formula:

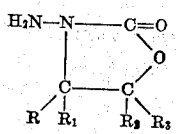

wherein

R is a member of the group consisting of hydrogen, lower alkyl and hydroxy (lower) alkyl
$R_1$ is a member of the group consisting of hydrogen, lower alkyl and hydroxy (lower) alkyl
$R_2$ is a member of the group consisting of hydrogen, lower alkyl and hydroxy (lower) alkyl, and
$R_3$ is a member of the group consisting of hydrogen, lower alkyl and hydroxy (lower) alkyl.

The new compounds of the series are particularly useful as intermediates for the preparation of members of a series of N-(5-nitro-2-furyl)-alkylidene - 3 - amino-2-oxazolidones, notably, N-(5-nitro-2-furfurylidene)-3-amino - 2 - oxazolidone, which I have invented and which form the subject of my copending application, Serial No. 274,066, filed February 28, 1952.

I have discovered that the various members of the new series of 3-amino-2-oxazolidones which I have invented can be prepared by methods which are both practicable and capable of supplying the desired derivative in good yield:

The method which I now prefer involves the reaction of a hydroxyalkylhydrazine and an alkyl carbonate, preferably diethyl carbonate. Schematically, this reaction may be represented by the following equation:

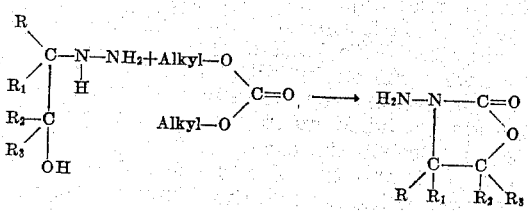

wherein

R is a member of the group consisting of hydrogen, lower alkyl and hydroxy (lower) alkyl
$R_1$ is a member of the group consisting of hydrogen, lower alkyl and hydroxy (lower) alkyl
$R_2$ is a member of the group consisting of hydrogen, lower alkyl and hydroxy (lower) alkyl, and
$R_3$ is a member of the group consisting of hydrogen, lower alkyl and hydroxy (lower) alkyl.

The reactants are heated together and any alcohol formed during the reaction is removed by fractional distillation to encourage the reaction to proceed to completion. An alkaline metal catalyst in small quantity is desirable in the reaction mixture in order that the reaction will take place smoothly. Such a catalyst is sodium methylate.

An alternative method of preparing the various members of the new series of 3-amino-2-oxazolidones is by the catalytic reduction of the corresponding 3-nitro-2 - oxazolidone derivative. The nitro compound is prepared by nitration of the selected 2-oxazolidone derivative under known conditions for the preparation of nitro derivatives. Hydrogenation of the nitro compound is carried out at atmospheric pressure and at a temperature within the range of 0° to 5° C. using Adams' platinum oxide as a catalyst. In approximately 5 hours nearly the theoretical amount of hydrogen is absorbed, whereupon the catalyst is filtered out.

The 3-nitro-2-oxazolidone may also be reduced electrolytically. In this method, sulfuric acid is employed as the catholyte, lead as the anode, a mercury pool as the cathode, and a current density of 0.204 amp./cm.$^2$ is used for 1 hour at a temperature of 5° to 10° C. This reduction produces the desired 3-amino-2-oxazolidone derivative from the corresponding 3-nitro-2-oxazolidone.

Another method of preparing the various members of the new series of 3-amino-2-oxazolidones which I have invented is by the treatment with acid solution of a 2-(2-hydroxyalkyl) semicarbazide hydrochloride. In this method, the hydroxyalkyl semicarbazide, for example, 2-(2-hydroxyethyl) semicarbazide, is added portion-wise to a refluxed solution of water and hydrochloric acid. Following the completion of the addition of the hydroxyethyl semicarbazide, the mixture is further refluxed for approximately 30 minutes, at the end of which time the solution is cooled and the reaction is complete.

In order that my invention may be entirely available to those skilled in the art, methods for making a number of the new compounds of the series are described briefly:

EXAMPLE I

*3-amino-2-oxazolidone*

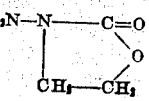

A. A mixture of 15.4 g. of 2-hydroxyethyl hydrazine, 30 cc. of diethyl carbonate and a solution of 0.6 g. of sodium in 10 cc. of methanol is placed in a flask equipped with a Vigreux column. The mixture is heated and the ethanol formed in the reaction slowly distilled. When the distillation of ethanol ceases, after about 1 hour, the residue is cooled and diluted with 10 cc. of ethanol. The resulting precipitate of 3-amino-2-oxazolidone is filtered off and dried, giving a yield of 14.2 g., 69% M. P.. 55–62° C. By recrystallization from ethanol the melting point is raised to 69–71° C.

B. To a suspension of 2.3 g. of 3-nitro-2-oxazolidone in a mixture of 37.66 cc. of water and 12.34 cc. of 4.053 N hydrochloric acid is added 0.07 g. of Adams' platinum oxide catalyst. Hydrogenation is then carried out at atmospheric pressure and at a temperature of 0–5° C. After 5 hours, 101% of the theoretical amount of hydrogen is absorbed. The catalyst is removed by filtration, leaving a solution of 3-amino-2-oxazolidone in 55% yield.

C. 3-nitro-2-oxazolidone is reduced electrolytically, using 160 cc. of 10% sulfuric acid as the catholyte, a lead anode, a mercury pool cathode and a current density of 0.204 amp./cm.$^2$ for one hour at a temperature of 5–10° C. At the end of this time the aqueous solution is separated from the mercury.

D. A mixture of 1500 cc. of water and 500 cc. of concentrated hydrochloric acid is heated to reflux and 100 g. of 2-(2-hydroxyethyl) semicarbazide hydrochloride added in small portions. The resulting solution is refluxed for 30 minutes and then cooled to room temperature.

EXAMPLE II

*3-amino-5-methyl-2-oxazolidone*

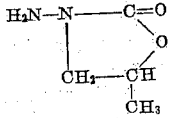

A mixture of 45 g. of 2-hydroxypropylhydrazine (prepared from the condensation of propylene chlorohydrin with hydrazine hydrate), 74 cc. of diethyl carbonate and a solution of 1.4 g. of sodium in 16 cc. of methanol is placed in a flask equipped with a Vigreux column. The mixture is heated and the ethanol formed in the reaction slowly distilled. When the distillation of ethanol ceases, after about 1 hour, the residue is cooled and diluted with 20 cc. of isopropanol. The resulting precipitate of 3-amino-5-methyl-2-oxazolidone is removed by filtration. Recrystallization from isopropanol gives 14.4 g., 24.8% of product, M. P. 40–42° C. The pure material after several recrystallizations melts at 50.3–50.5° C.

EXAMPLE III

*3-amino-4,5-dimethyl-2-oxazolidone*

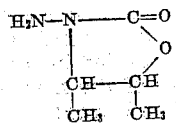

To a solution of 1.3 g. of sodium in 15 cc. of methanol is added 18.7 g. of 3-hydrazino-2-butanol (prepared by the condensation of 2,3-epoxybutane with hydrazine hydrate) and 23.5 g. of diethyl carbonate. The mixture is refluxed for 1 hour, with stirring, and then the methanol, ethanol, excess diethyl carbonate and unreacted 3-hydrazino-2-butanol removed by vacuum distillation.

EXAMPLE IV

*3-amino-4-butyl-2-oxazolidone*

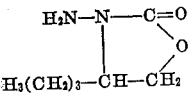

A mixture of 9.5 g. of 2-hydrazino-1-hexanol (prepared by the reduction of ethyl α-hydrazinocaproate with lithium aluminum hydride), 10 g. of diethyl carbonate and a solution of 0.35 g. of sodium in 5 cc. of methanol is refluxed for 2 hours. A small amount of insoluble material is removed by filtration and the filtrate distilled in vacuo. A forerun of methanol, ethanol, excess diethyl carbonate and unreacted 2-hydrazino-1-hexanol is first obtained. The product of the reaction, 3-amino-4-butyl-2-oxazolidone, distills at 135° C./0.7 mm.

EXAMPLE V

*3-amino-5-hydroxymethyl-2-oxazolidone*

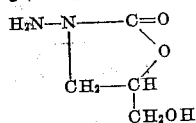

A solution of 43 g. of sodium hydroxide in 250 g. of hydrazine hydrate (100%) is warmed to 40° C. and then treated dropwise with 110 g. of glycerol α-monochlorohydrin, over a period of 15 minutes, the temperature rising to 110°. The reaction mixture is then heated on the steam bath for 80 minutes and the water and excess hydrazine removed in vacuo. The residue is diluted with absolute alcohol and the sodium chloride present removed by filtration. The filtrate is concentrated in vacuo to remove the alcohol. To the residual oil is added 150 cc. of diethyl carbonate and a solution of 1 g. of sodium in 25 cc. of methanol. This mixture is heated and the ethanol formed in the reaction is slowly distilled over a period of 3½ hours.

EXAMPLE VI

*3-amino-4,4-dimethyl-2-oxazolidone*

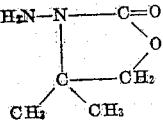

4,4-dimethyl-3-nitro-2-oxazolidone (3.96 g.) is reduced electrolytically under the conditions given in Example I, section C. After the aqueous solution is separated from the mercury, it is neutralized with barium hydroxide, the barium sulfate removed by filtration and the filtrate evaporated in vacuo to remove the water. The residue is taken up in a small amount of absolute alcohol, the excess barium hydroxide filtered off, and the filtrate distilled. After the removal of the alcohol, the 3-amino-4,4-dimethyl-2-oxazolidone distills at 130–135° C./10 mm.

What I claim is:
1. A new chemical compound represented by the formula:

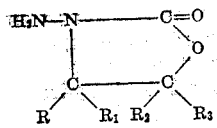

wherein

R is a member of the group consisting of hydrogen, lower alkyl and hydroxy (lower) alkyl $R_1$ is a member of the group consisting of hydrogen, lower alkyl and hydroxy (lower) alkyl $R_2$ is a member of the group consisting of hydrogen, lower alkyl and hydroxy (lower) alkyl, and $R_3$ is a member of the group consisting of hydrogen, lower alkyl and hydroxy (lower) alkyl.

2. 3-amino-2-oxazolidone represented by the formula:

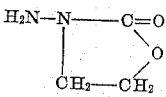

3. 3-amino-5-methyl-2-oxazolidone represented by the formula:

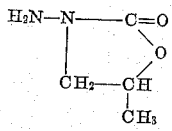

4. 3-amino-4,5-dimethyl-2-oxazolidone represented by the formula:

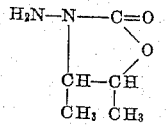

5. 3-amino-4-butyl-2-oxazolidone represented by the formula:

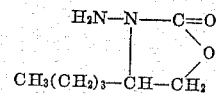

6. 3-amino-5-hydroxymethyl-2-oxazolidone represented by the formula:

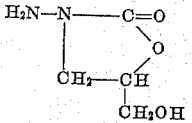

7. The method of preparing a 3-amino-2-oxazolidone represented by the formula:

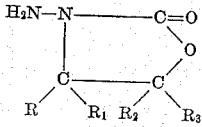

wherein

R represents a member of the group consisting of hydrogen, lower alkyl and hydroxy (lower) alkyl $R_1$ represents a member of the group consisting of hydrogen, lower alkyl and hydroxy (lower) alkyl $R_2$ represents a member of the group consisting of hydrogen, lower alkyl and hydroxy (lower) alkyl $R_3$ represents a member of the group consisting of hydrogen, lower alkyl and hydroxy (lower) alkyl which comprises reacting a β-hydroxyalkylhydrazine represented by the formula:

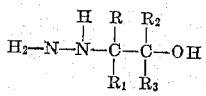

wherein R, $R_1$, $R_2$ and $R_3$ have the significance above given, with diethyl carbonate in the presence of an alkaline metal catalyst.

GABRIEL GEVER.

References Cited in the file of this patent

UNITED STATES PATENTS

| Number | Name | Date |
|---|---|---|
| 2,399,118 | Homeyer | Apr. 23, 1946 |

OTHER REFERENCES

Recueil Travaux Chimiques des Pays-Bas 21, pp. 45–55 (1902).